(12) United States Patent
Luthardt et al.

(10) Patent No.: US 6,967,794 B2
(45) Date of Patent: Nov. 22, 2005

(54) LATCH MECHANISM

(75) Inventors: Dirk Luthardt, Wetzlar (DE); Myron Javorsky, Prerov (CZ); Olsa Milan, Domaz lice (CZ)

(73) Assignee: Hensoldt AG, Wetzlar (DE)

( * ) Notice: Subject to any disclaimer, the term of this patent is extended or adjusted under 35 U.S.C. 154(b) by 0 days.

(21) Appl. No.: 10/695,557

(22) Filed: Oct. 27, 2003

(65) Prior Publication Data
US 2004/0141232 A1 Jul. 22, 2004

Related U.S. Application Data

(63) Continuation of application No. PCT/EP02/04569, filed on Apr. 25, 2002.

(51) Int. Cl.[7] ............................................... G02B 7/02
(52) U.S. Cl. ...................... 359/827; 359/830; 359/399
(58) Field of Search .............................. 359/399, 808, 359/827, 828, 830

(56) References Cited

U.S. PATENT DOCUMENTS

| | | | | | |
|---|---|---|---|---|---|
| 4,302,077 A | * | 11/1981 | Sato et al. | ................... | 359/828 |
| 4,600,277 A | * | 7/1986 | Murray, Jr. | ................... | 359/423 |
| 5,249,082 A | * | 9/1993 | Newman | ..................... | 359/813 |
| 5,644,441 A | * | 7/1997 | Hirasaki et al. | ............ | 359/828 |

* cited by examiner

*Primary Examiner*—Mark A. Robinson

(57) ABSTRACT

A latch mechanism for producing a releasable connection of a housing portion with a further housing portion provides projections on one of the housing portions, and for producing a releasable connection by means of a rotational motion of the housing portions relative to one another, the latch projections latchingly engaging in associated latch recesses, where the latching mechanism includes a rotatably mounted ring element including the recesses for receiving the projections. The latching mechanism can be connected by means of further latch recesses and further latch projections to the further housing portion.

17 Claims, 4 Drawing Sheets

LATCH MECHANISM

CROSS-REFERENCES TO RELATED APPLICATIONS

This is a Continuation of International Patent Application PCT/EP02/04569 filed 25 Apr. 2002, which claims priority of German Patent Application 101 21 439.1 filed 27 Apr. 2001.

STATEMENT REGARDING FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON COMPACT DISC

Not applicable.

BACKGROUND OF THE INVENTION

1. Field of the Invention

The invention relates to a latch mechanism for producing a releasable connection of a housing portion with a further housing portion, projections being provided on one of the housing portions, and for producing a releasable connection by means of a rotational motion of the housing portions relative to one another, the latch projections latchingly engaging in associated latch recesses.

2. Description of Related Art Including Information Discussed Under 37 CFR 1.97 and 1.98

From U.S. Pat. No. 4,600,277, a telescope is known with a main housing and at least two interchangeable monocular systems. The two monocular systems differ definitively in that a first monocular system has a coaxial arrangement or alignment with respect to the optical axis of the telescope. A second monocular system has an angular shape and permits looking into the telescope at an angle of 45° to the optical axis, which is established by the lenses mounted in the main housing. The monocular arrangements can be connected to the main housing or to the telescope, respectively, by means of a bayonet coupling means. The bayonet coupling means includes L-shaped projections on the monocular system. These projections are fixedly connected to the housing of the respective monocular system and have an axial alignment in relation to the optical axis. Recesses are allocated to these projections, and are formed in a plate fixedly connected to the main housing and arranged at right angles to the optical axis of the telescope. The projections and the recesses have different extensions in the peripheral direction in comparison with each other, so that the monocular system can assume only a predetermined and thus defined position when the monocular system and main housing are connected.

For connecting the main housing and the monocular system, the projections are guided in an axial direction through the recesses formed in the plate. The L-shaped projections then clamp behind this plate by means of a rotational motion. For fixing, a pin is provided which latches into a recess provided in the monocular system. To release the monocular system, this pin, which is prestressed by a spring, has to be withdrawn by the user. For this, an operating element is provided which is to be operated by the user for this purpose.

From U.S. Pat. No. 2,260,991, a latch mechanism is known for providing a releasable connection of an objective with a camera housing. In this latch mechanism also, a plate fixed to the camera housing is provided. Recesses are provided in this plate with different extensions in the peripheral direction. Projections facing radially, formed on the objective housing, cooperate with these recesses when producing a fixed connection. To produce the fixed connection, the projections pass through the recesses of the plate connected to the camera. By rotation of the objective, the projections of the objective clamp behind the plate.

In these systems, it is disadvantageous that the projections formed on a component are strongly loaded when latching into the other component such as a main housing or camera housing. On frequent connection and release, damage of the projections results due to this strong loading.

SUMMARY OF THE INVENTION

The invention has as its object to further develop a releasable connection so that the loading on the projections provided for producing the connection is diminished.

The object of the invention is attained by a latching mechanism that includes a rotatably mounted ring element comprising recesses for receiving the projections; the latching mechanism being connectable by means of further latch recesses and further latch projections to the further housing portion. By the measure of providing a latch mechanism with a rotatably mounted ring element which has recesses to receive the projections, the releasable connection being provided by means of the ring element, the loading acting on the projections could be reduced, since the projections are received by the recesses on executing the rotary motion.

The projections can be introduced without force, or nearly without force, into the recesses formed in the ring element. On executing the rotary motion for producing the fixed connection of the ring element with the other housing portion, the connection is produced by means of the ring element and thus the loading to which the projections are subjected is strongly reduced.

It has been found to be advantageous to allocate at least one spring element to, and cooperating with, the ring element, so that the stress energy
of this spring element becomes free when the fixed connection of the housing portions is produced.

It has been found to be advantageous that on relieving the spring element, at least one of the provided latch projections latches into an associated latch groove. The ring element is thereby fixed against rotation. Positive locking is produced by the latching of the latch projections into the latch grooves. These latch projections and latch grooves can be arranged with radial alignment or else with axial alignment.

With radial alignment, it has been found to be advantageous to allocate respectively two diametrically opposite spring elements, so that the coaxial position of the ring element with respect to the optical axis is maintained. A coaxial arrangement of the housing portion connected to the ring element by means of the projections can easily be provided thereby. No decentering of the housing portions on releasing the housing portions must be taken into account. This has an advantageous effect when testing tolerances of the components. In particular, whether the projections have a symmetrical arrangement with respect to the optical axis can easily be tested.

It has been found to be advantageous that the ring element executes a motion in the axial direction when the spring element(s) is/are relieved, the axial direction being established by the optical axis. With such an arrangement, it can also be provided that the ring element executes a tilting motion for the production of latching. This can in particular occur when only one spring element is provided.

It has been found to be advantageous to provide plural spring elements acting axially parallel. A motion of the ring element parallel to the optical axis on releasing, or also on producing, the latching can be provided particularly easily by the provision of two or more spring elements.

It has been found to be advantageous that the ring element of the latching mechanism never gives a truly axial arrangement, both on releasing and also on producing the connection.

It has been found to be advantageous that the latch projection is simultaneously formed by means of the spring element. On latching of the spring element, stress energy becomes free, in that the spring element latches into the latch groove. This contributes to a particularly simple construction of a latching mechanism.

It has been found to be advantageous to provide leaf springs, which are inexpensively obtainable and function reliably, as the spring elements.

It has been found to be advantageous to place the spring elements so that the moment required for producing the releasable connection is greater than the moment which has to be applied to produce the connection. Inadvertent release is thereby countered.

It has been found to be advantageous to provide main springs by means of which axial play of the housing portions with respect to one another is compensated. In particular, if optical elements re arranged in the housing portions, an axial play can result which presents the user with an unsharp image.

This latch mechanism has been found to be particularly suitable for connecting optical components, particularly an eyepiece and an optical device.

This latch mechanism is particularly suitable for telescopes with interchangeable eyepieces, so that changing the eyepiece is easily performed and functions reliably. In particular, it is not necessary to operate a separate lever, which would act negatively on handling when changing the eyepiece. Release with this latching mechanism can be produced by solely moving the housing portions, particularly eyepiece and housing, relative to each other.

BRIEF DESCRIPTION OF THE SEVERAL VIEWS OF THE DRAWINGS

Further advantageous measures are described in the specific and claims. The invention is described using the following embodiment:

DETAILED DESCRIPTION OF THE INVENTION

Figure 1:
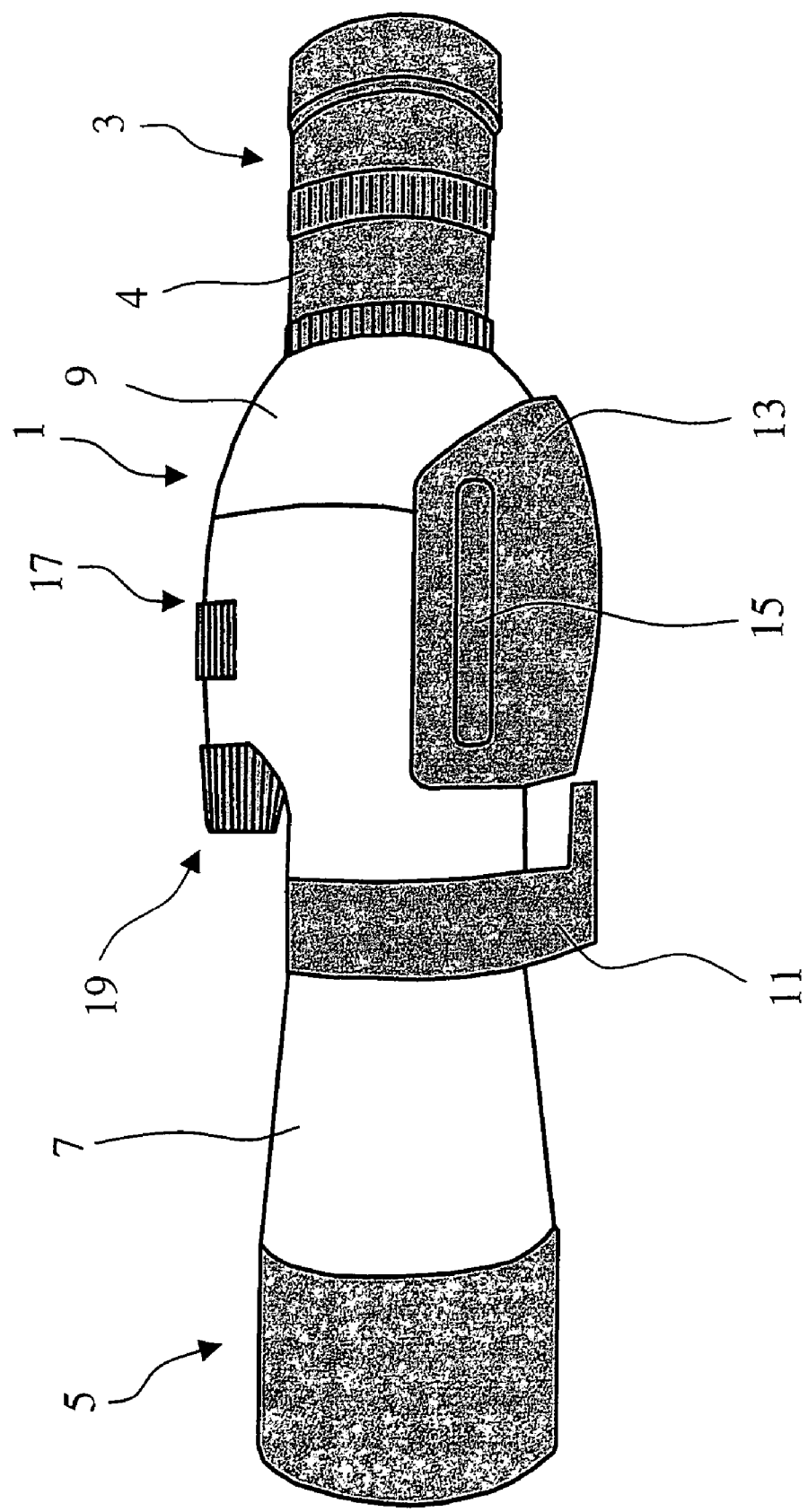
FIG. 1 shows a telescope.

A telescope with an axial monocular is shown in FIG. 1; the invention is described in detail with reference thereto.

The telescope 1 comprises an objective 5, an eyepiece 3, and two housing portions 7, 9. In this embodiment, the objective 5 is fixedly connected to the housing portion 7, and the eyepiece is releasably connected to the housing portion 9. The housing portions 7 and 9 are in their turn fixedly connected together. Furthermore, the telescope 1 has a grip region 13 in which grip grooves 15 are formed on both longitudinal sides. A stand fastening 11 is provided for connection to a stand. The telescope can be focused by means of a fine drive 19 and a coarse drive 17.

Figure 2:
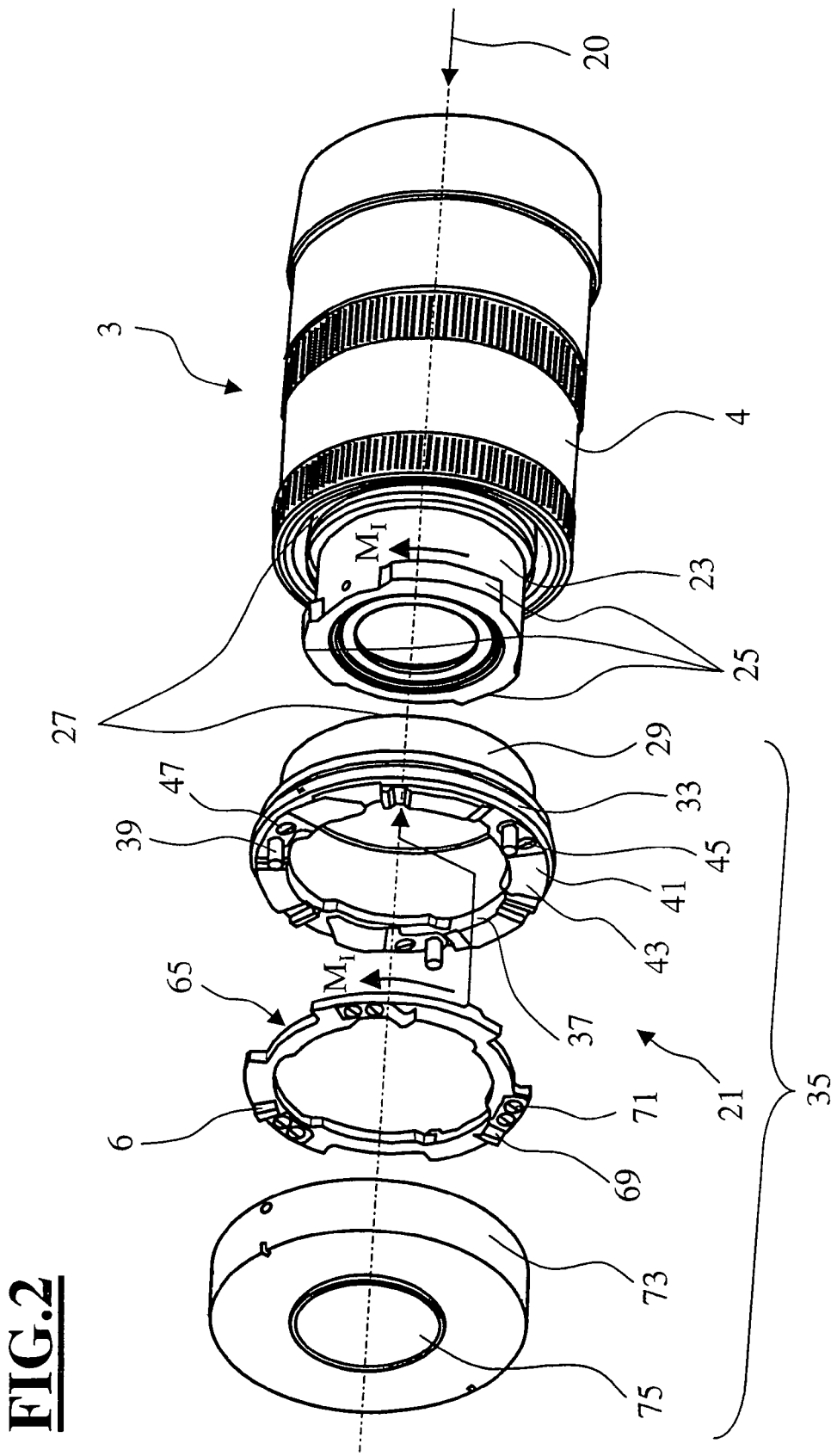
FIG. 2 shows a latching mechanism.
Figure 3:
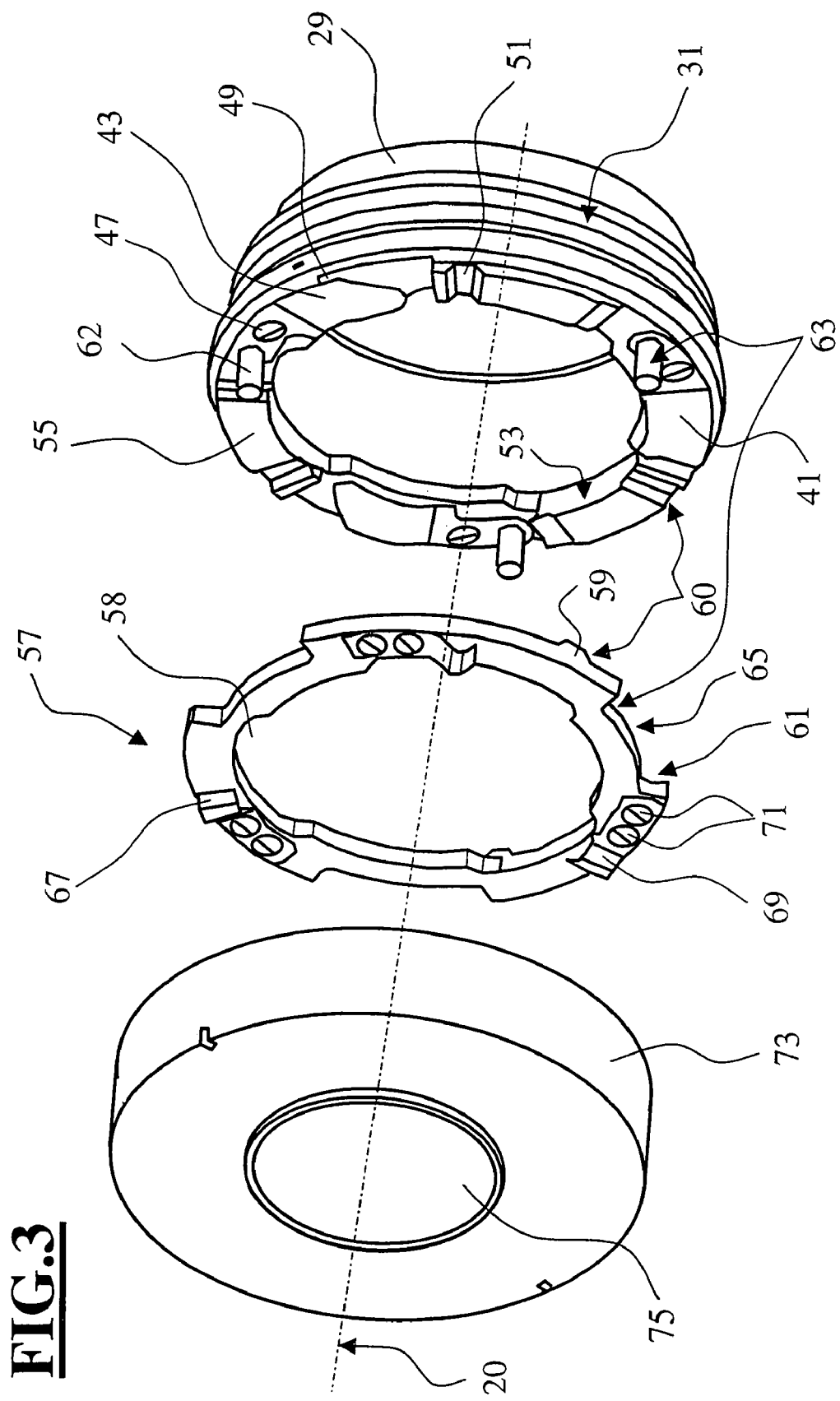
FIG. 3 shows an enlarged illustration of the latch mechanism being engaged.

The releasable connection between the housing portion 9 and the eyepiece 3, or respectively a housing 4 of the eyepiece, is described in detail using FIG. 2. The housing 4 of the eyepiece 3 is arranged coaxially of an optical axis which is established by the optical lenses, not shown, provided in the eyepiece 3. On the side to be connected to the housing portion 9, the eyepiece 3 has an extension 23. The extension is provided at its ends with projections 25. These projections 25 have different shapes, here different extension in the peripheral direction. However, a different extension of the projections in the radial direction, or respectively solely a different shape of the projections, such as diamond-shaped, annular segment, etc., can however be provided. A seating 35 is arranged in the housing portion 9 of the telescope 1. This seating 35 comprises a cover 73, a ring element 57, and a sleeve 29. The cover 73 is provided with a closure plate 75 which is transparent and by means of which an internal volume of the telescope is sealed from the exterior. In particular, it can be ensured by means of the cover 73 with closure plate 75 that no moisture can penetrate into the volume formed by the housing portions 7, 9 and the objective. This internal volume is also thereby protected from dirt particles, particularly dust.

The ring element 57 is rotatably mounted in the cover 73. Guide slots 65 are formed on the radial outer circumference of the ring element 57 for rotatable mounting, and are arranged together with rods 62 arranged coaxially of the optical axis of the telescope 1; the rods 62 are arranged stationary, by fixed connection with the sleeve 29 in the embodiment example shown. A limitation 63 of the rotation of the ring element 57 is provided by cooperation of the rods 62 with the guide slots 65.

This sleeve 29 is fixedly connected to the cover 73, so that the ring element 57 arranged between these can be moved to a limited extent between the sleeve 29 and the cover 73.

The ring element 57 is provided with leaf springs 69, fixedly connected by screws 71 to the ring element, on the side facing the cover 73. The spring force of the leaf springs 69 acts in the axial direction. In the assembled state, the leaf springs 69 are supported against the cover 73. The ring element 57 is provided on the opposite side with latch projections 59, which are arranged aligned in the axial direction. At least one latch projection 59 has a ramp 60 directed peripherally. If the latch projections 59 are received by the latch grooves 51, it is ensured by means of the ramp 60 that the ring element 57 simultaneously executes a movement in the axial direction upon rotation of the ring element, due to the ramp 60 cooperating with the latch grooves 51. The ramp 60 can also be formed on the latch grooves 51. The spring elements 67, or respectively the leaf springs 69, are simultaneously prestressed when the latch projections 59 come out of the latch grooves 51. To reduce the surface pressing of the latch groove 51 and latch projection 59 per surface segment, preferably both are formed with a ramp 60, which is provided on the surfaces cooperating when releasing the connection. If the spring elements 67 are prestressed, the latch projections 59 are connected to the contact regions 55 formed on the sleeve 29, or respectively are supported on this. These contact regions 55 are formed by axial projections 53 which are integrally formed with the sleeve 29. These contact regions are arranged bordering on the latch grooves 51 in the peripheral direction.

If the leaf springs 69 also function as latch projections (not shown), the leaf springs provided could be arranged instead of the latch projections, and the ring element would be in sliding contact with the cover on the opposite side. Latch projections and latch grooves could of course be provided on the cover side, and the ring element would then be in sliding connection with the sleeve.

The spring elements prestressed when the latch mechanism is released give rise to contact friction arising on rotation of the ring element 57, ensuring that unintentional rotation of the ring element does not occur. This is particularly advantageous on inserting the projections 25 into the recesses 58 formed in the ring element 57. The recesses 58 are arranged aligned tangentially on the inner side of the ring element.

The sleeve 29 is provided with main springs 41 on the side facing the ring element 57. The spring force of the main springs acts in the axial direction. As main springs 41 in this embodiment example, leaf springs 43 are fixedly connected to the sleeve 29 by fastening elements, here screws 47. Recesses 49 for providing a possible spring path for the main springs 41 are formed under the leaf springs. The sleeve 29 has a radial profile 31 at the external periphery. This radial profile 31 comprises two annular projections. This profile acts to produce the fixed connection of the cover 73 and sleeve 29.

A joint ring 33 is provided on the side of the sleeve 29 facing the eyepiece 3 and, together with the groove formed running around the eyepiece 3, a stop 27 is formed thereby.

Figure 4:
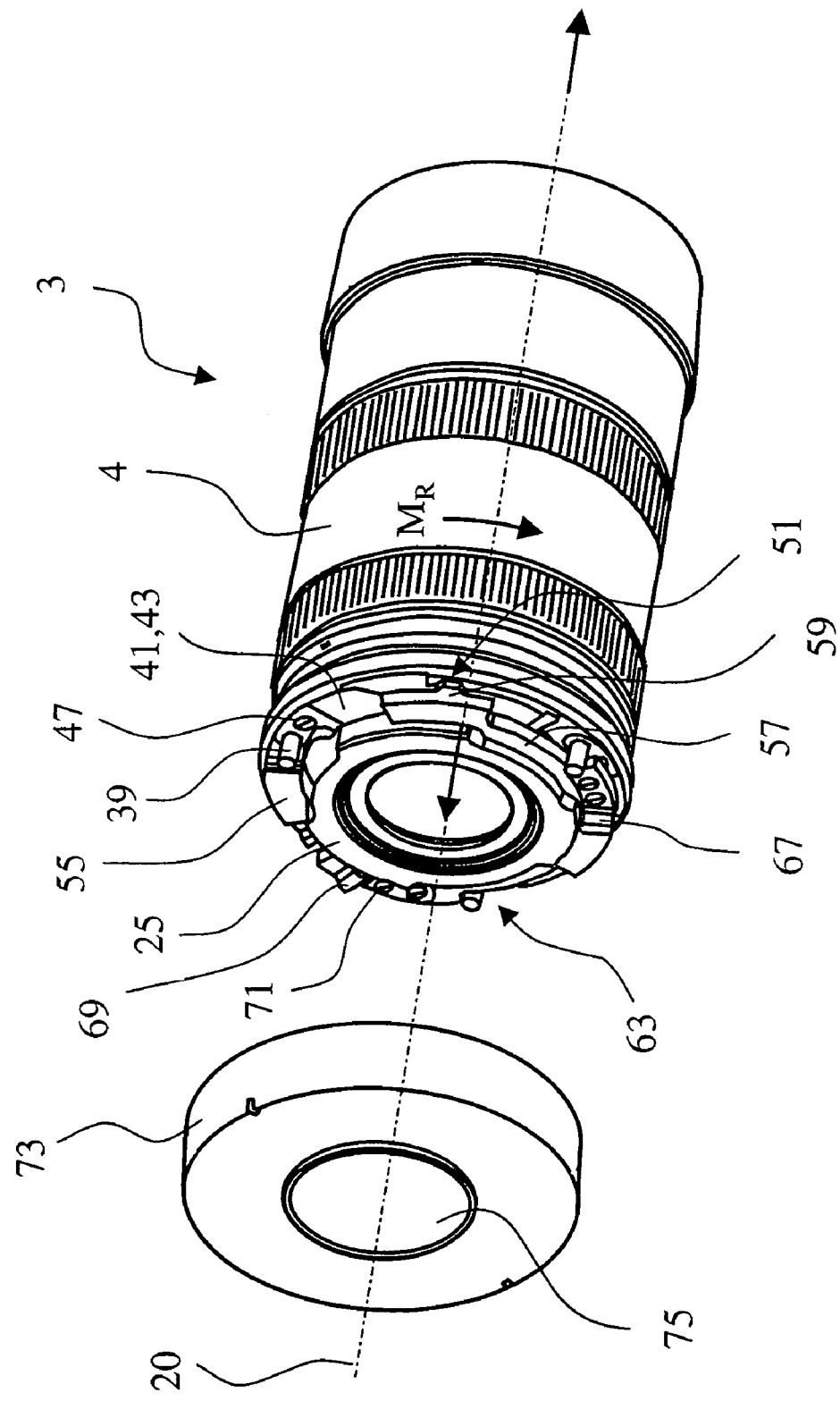
FIG. 4 shows a diagram of projections received in the ring element.

The eyepiece has an extension 23 on the side facing the sleeve 29 and aligned coaxially of the optical axis 20. If the eyepiece is fixedly connected to the telescope, the sleeve 29 and also the ring element 57 are arranged coaxially of the extension 23. The mounting of this extension 23 within the sleeve 29, with the ring element 57 rotatably mounted on the extension, is shown in FIG. 4. The projections 25 are formed at the end on the side of the extension 23 facing the sleeve 29.

To join the eyepiece 3 to the telescope 1, the extension 23 is inserted into the sleeve 29, the projection 25 being received by the recesses 58. By rotating the housing 4 of the eyepiece 3 relative to the housing portion 9, the ring element 57 is also rotated relative to the cover 73 and the sleeve 29. Upon reaching the latching position provided, the latch projections 59 engage in latch grooves 51. The ring element 57, started by the spring elements 67, then moves in the axial direction, upon which the spring elements relax.

With the arrangement of the latch projections and latch grooves in the radial direction (not shown), the spring element is to be arranged such that the spring force of the spring elements also acts in the radial direction, so that the stress energy of the spring elements is released upon latching.

We claim:

1. A latch mechanism for producing a releasable connection of a housing portion (4) with a further housing portion (7), projections being provided on one of the housing portions, and for producing a releasable connection by means of a rotational motion of the housing portions relative to one another, the latch projections (25) latchingly engaging in associated latch recesses (58), wherein the latching mechanism (21) includes a rotatably mounted ring element (57) comprising the recesses (58) for receiving the projections (25), the latching mechanism being connectable by means of further latch recesses (51) and further latch projections (59) to the further housing portion (7) wherein at least one spring element (67) cooperates with the ring element (57), and upon production of the releasable connection with the housing portions (4, 9), stress energy of the at least one spring element (67) is relieved, and the ring element (57) moves in an axial direction along an optical axis of the housing (20) when the spring element (67) is released.

2. A latch mechanism for producing a releasable connection of a housing portion (4) with a further housing portion (7), projections being provided on one of the housing portions, and for producing a releasable connection by means of a rotational motion of the housing portions relative to one another, the latch projections (25) latchingly engaging in associated latch recesses (58), wherein the latching mechanism (21) includes a rotatably mounted ring element (57) comprising the recesses (58) for receiving the projections (25), the latching mechanism being connectable by means of further latch recesses (51) and further latch projections (59) to the further housing portion (7) wherein at least one spring element (67) cooperates with the ring element (57), and upon production of the releasable connection with the housing portions (4, 9), stress energy of the at least one spring element (67) is relieved, and the further latch projection (59) comprises the spring element (67).

3. The latch mechanism according to claim 1 or 2, wherein the further latch projection (59) and the further latch recess (51) are arranged with perpendicular alignment in relation to an alignment of the projections (25).

4. The latch mechanism according to claim 3, wherein the further latch recess (51) or the further latch projection (59) has a ramp (60) in a direction of rotation of the ring element (57) for releasing the latch connection.

5. The latch mechanism according to claim 4, wherein a slope of the ramp is chosen so that a moment required for releasing a connection is greater than a moment required for producing a connection of the two housing portions (4, 9).

6. The latch mechanism according to claim 1 or 2, wherein the further latch projection (59) comprises the spring element (67).

7. The latch mechanism according to claim 1 or 2, wherein a spring force of the at least one spring element acts in a radial direction and a latch groove or the latch projection is arranged on a periphery of the ring element (57) with radial alignment.

8. The latch mechanism according to claim 7, wherein respectively two spring elements are arranged diametrically oppositely, so that on latching the ring element (57), a coaxial arrangement to the optical axis (20) of the housing is retained.

9. The latch mechanism according to claim 1 or 2, comprising a plurality of parallel acting spring elements (67).

10. The latch mechanism according to claim 1 or 2, comprises a plurality of further latch projections (59) with associated latch recesses (51).

11. The latch mechanism according to claim 1 or 2, further comprising main springs (41) for compensation of an axial play of the housing portion and the further housing portion relative to one another.

12. The latch mechanism according to claim 11, wherein the main springs (41) are under stress only when the housing portions (4, 9) are connected.

13. The latch mechanism according to claim 11, wherein the main springs (41) come into active connection with the projections (25) for compensating the axial play.

14. The latch mechanism according to claim 1 or 2, wherein the ring element (57) is arranged between a cover (73) and a sleeve (29), the cover (73) and the sleeve (29) being arranged stationary to one of the housing portions (9).

15. The latch mechanism according to claim 14, wherein the ring element (57) is rotatable by a predetermined angular amount by means of stops.

16. An eyepiece for an optical device, wherein the eyepiece comprises a housing portion (4) which is connectable to the optical device (1) of the housing by means of a latch mechanism according to claim 1.

17. A telescope with an interchangeable eyepiece, comprising a latch mechanism (21) according to claim 1 for producing a releasable connection of the eyepiece (3) to the telescope (1).

* * * * *